(12) United States Patent  
Sakai

(10) Patent No.: US 9,357,093 B2  
(45) Date of Patent: May 31, 2016

(54) INFORMATION PROCESSING APPARATUS, METHOD FOR CONTROLLING INFORMATION PROCESSING APPARATUS, AND RECORDING MEDIUM FOR CONTROLLING POWER SUPPLY TO A DEVICE OF THE INFORMATION PROCESSING APPARATUS

(71) Applicant: CANON KABUSHIKI KAISHA, Tokyo (JP)

(72) Inventor: Katsuya Sakai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/636,920

(22) Filed: Mar. 3, 2015

(65) Prior Publication Data

US 2015/0256700 A1 Sep. 10, 2015

(30) Foreign Application Priority Data

Mar. 6, 2014 (JP) ................. 2014-044014

(51) Int. Cl.
*H04N 1/00* (2006.01)

(52) U.S. Cl.
CPC ....... *H04N 1/00904* (2013.01); *H04N 1/00891* (2013.01); *H04N 2201/0094* (2013.01)

(58) Field of Classification Search
None
See application file for complete search history.

(56) References Cited

U.S. PATENT DOCUMENTS 7,768,667 B2 * 8/2010 Hino ................ G06F 3/1204
358/1.15
8,625,119 B2 * 1/2014 Tsujimoto .......... H04N 1/00204
358/1.13

FOREIGN PATENT DOCUMENTS

JP 2011199777 A 10/2011

* cited by examiner

*Primary Examiner* — Paul F Payer
(74) *Attorney, Agent, or Firm* — Canon U.S.A., Inc. IP Division

(57) ABSTRACT

An information processing apparatus on which a plurality of applications is installed and which includes a device includes a display unit configured to display a screen for selecting an application to execute from among the plurality of applications, an acquisition unit configured to obtain attribute information about the application selected on the screen displayed on the display unit, a determination unit configured to determine whether the selected application is a specific application based on application information obtained by the acquisition unit, and a control unit configured to, if the determination unit determines that the selected application is the specific application, control power supply to the device based on device information obtained by the acquisition unit, and if the determination unit determines that the selected application is not the specific application, perform control so that the power is supplied to the device.

13 Claims, 12 Drawing Sheets

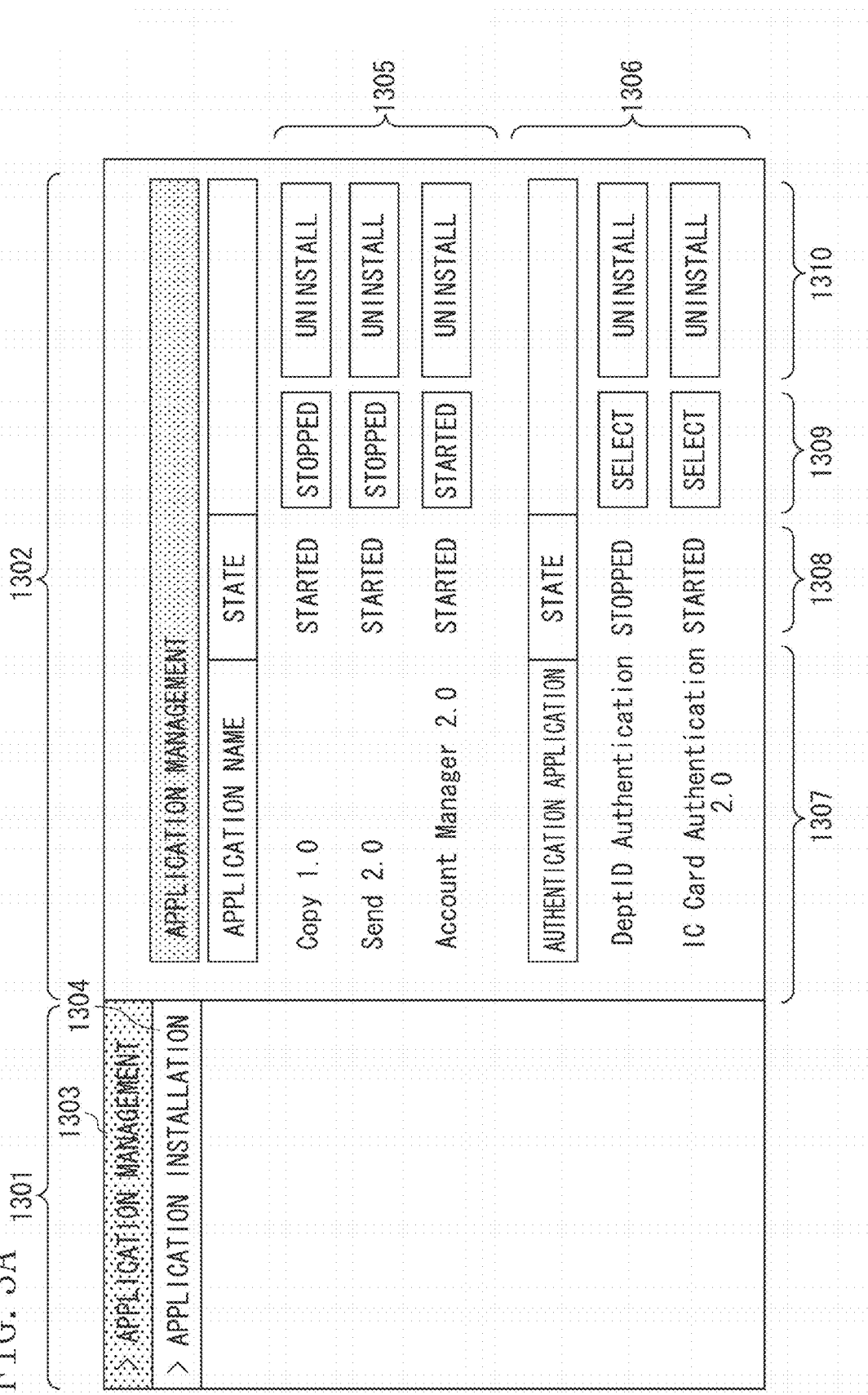

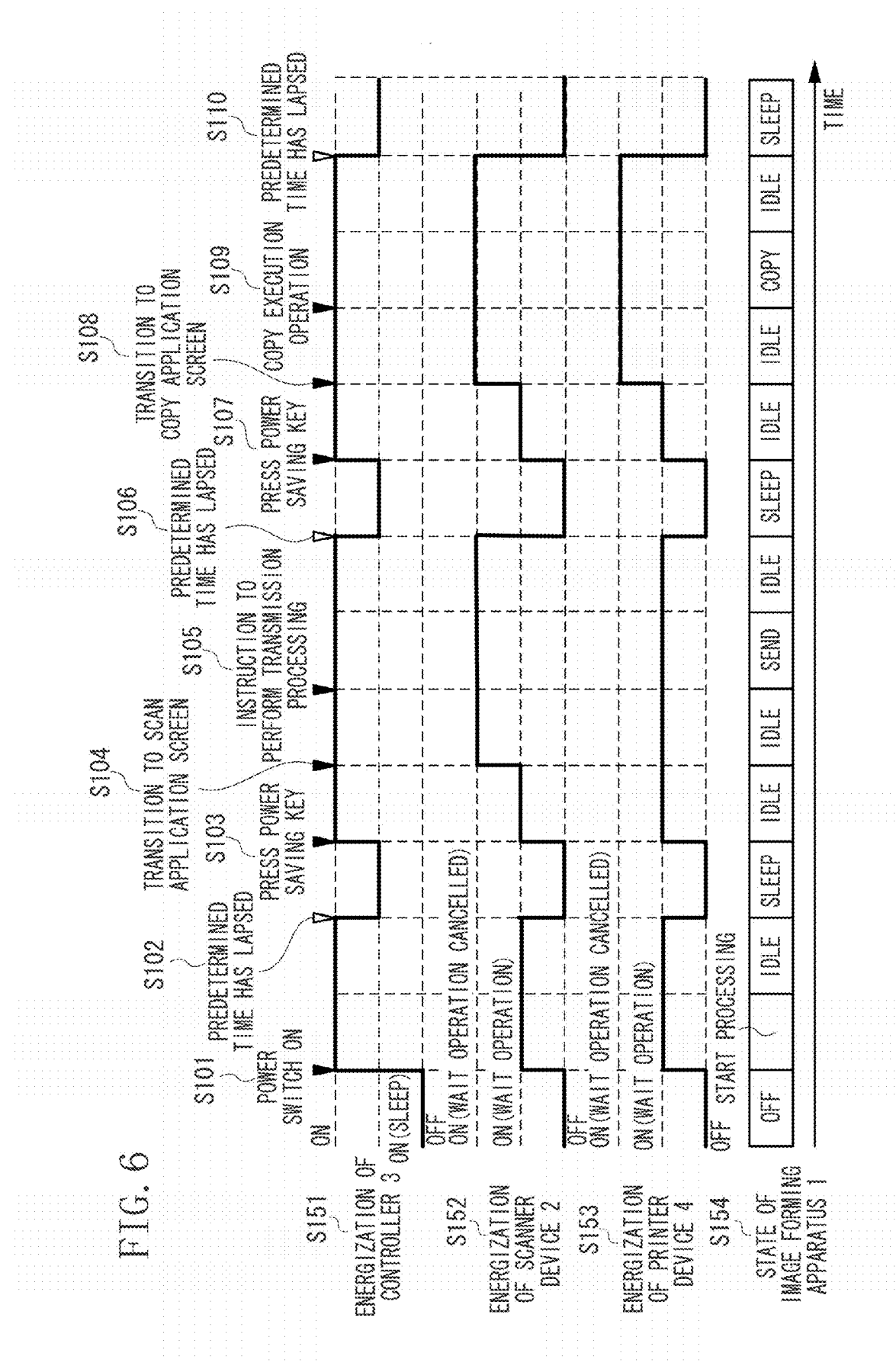

FIG. 7A

| | |
|---|---|
| 701 — | ApplicationName: Send |
| 702 — | ApplicationVersion: 2.0 |
| 703 — | SmartPowerSaver: Supported |
| 704 — | InitRequiredDevice: Scanner |

FIG. 7B

| | |
|---|---|
| 701 — | ApplicationName: Copy |
| 702 — | ApplicationVersion: 1.0 |

FIG. 7C

| | |
|---|---|
| 701 — | ApplicationName: IC Card Authentication |
| 702 — | ApplicationVersion: 2.0 |
| 705 — | ApplicationType: Authentication |

FIG. 10

| APPLICATION ID 901 | APPLICATION NAME 902 | APPLICATION TYPE 903 | SCANNER CONTROL 904 | PRINTER CONTROL 905 |
|---|---|---|---|---|
| 111111 | IC Card Authentication | Authentication | False | False |
| 222222 | SEND | GENERAL | True | False |
| 333333 | COPY | GENERAL | True | True |
| 444444 | AccoutManag | GENERAL | False | False |
| 10 | SecurePrint | System | False | False |

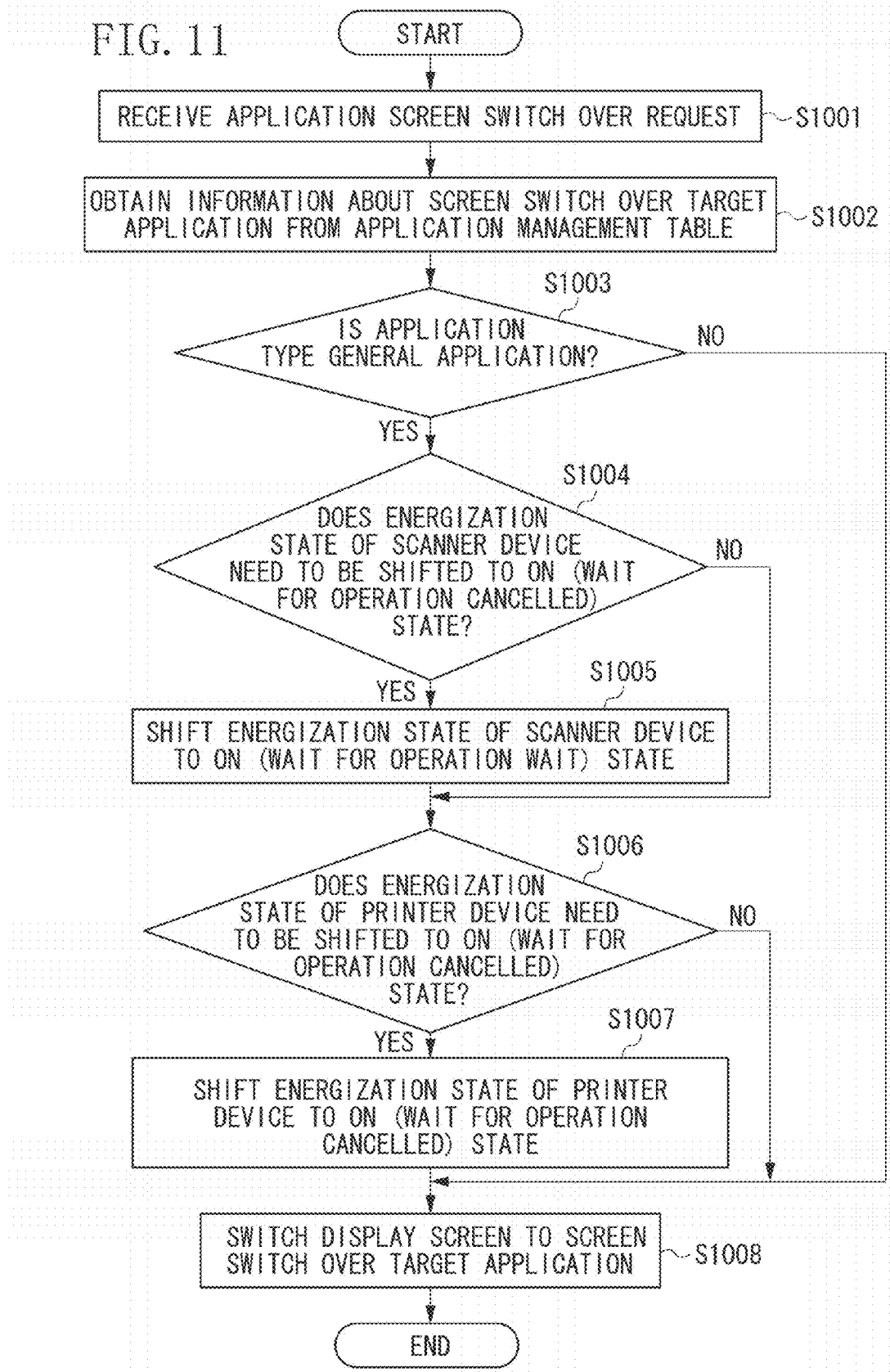

INFORMATION PROCESSING APPARATUS, METHOD FOR CONTROLLING INFORMATION PROCESSING APPARATUS, AND RECORDING MEDIUM FOR CONTROLLING POWER SUPPLY TO A DEVICE OF THE INFORMATION PROCESSING APPARATUS

BACKGROUND OF THE INVENTION

1. Field of the Invention

The present invention relates to energization control of a device (such as a scanner device and a printer device) included in an information processing apparatus.

2. Description of the Related Art

Along with improvement of power saving functions, a technique has recently been discussed for energizing a functional device included in an image forming apparatus when it is detected that the functional device is going to be used by a user. According to the technique, for example, functional devices of the image forming apparatus such as a printer device, a scanner device, and a facsimile (FAX) device are energized from power supply only when they are used. More specifically, the scanner device is energized only when a scan function is used. The printer device is energized only when a print function is used. The FAX device is energized only when a FAX function is used. Similarly, boards and chips related to the printer device, the scanner device, and the FAX function are concurrently energized only when they are used (Japanese Patent Application Laid-Open No. 2011-199777).

However, the printer device, the scanner device, and the FAX device are energized and initialized after the image forming apparatus determines to perform the processing. Initialization time is thus needed for energization, software initialization, and hardware preprocessing. As a result, it takes long to start the printer device, the scanner device, and the FAX device. The execution of the processing delays accordingly, which reduces the user's convenience.

To address such a problem, an application that provides a function of the image forming apparatus may perform by itself the initialization processing and energization processing of an appropriate device at appropriate timing before inputting a job. For example, a COPY application may initialize and energize the scanner device and the printer device when displaying a copy setting screen. Further, a SEND application may initialize the scanner device when displaying a transmission setting screen.

However, into applications created in the past (hereinafter referred to as legacy applications), the processing for initializing and energizing an appropriate device at appropriate timing is not incorporated. If a legacy application is run on the foregoing image forming apparatus, the legacy application cannot perform initialization and energization processing at appropriate timing and the initialization and energization processing are not performed until a job is submitted. Therefore, a problem remains that the performance of the legacy applications at the time of job execution drops as compared to when the legacy applications are run on a conventional image forming apparatus.

SUMMARY OF THE INVENTION

The present invention is directed to providing a mechanism that can prevent a drop in performance at the time of job execution even when a legacy application is running which does not support independent energization control for each functional device.

According to an aspect of the present invention, an information processing apparatus on which a plurality of applications is installed and which includes a device, includes a display unit configured to display a screen for selecting an application to execute from among the plurality of applications, and an acquisition unit configured to obtain attribute information about the application selected on the screen displayed on the display unit, wherein the attribute information includes application information indicating whether the selected application is a specific application, and device information indicating whether to supply power to the device when executing the selected application. Further, the information processing apparatus includes a determination unit configured to determine whether the selected application is the specific application based on the application information obtained by the acquisition unit, and a control unit configured to, if the determination unit determines that the selected application is the specific application, control power supply to the device based on the device information obtained by the acquisition unit, and if the determination unit determines that the selected application is not the specific application, perform control so that the power is supplied to the device.

Further features of the present invention will become apparent from the following description of exemplary embodiments with reference to the attached drawings.

BRIEF DESCRIPTION OF THE DRAWINGS

FIGS. 3A and 3B illustrate web screens for managing applications running on the image processing apparatus.

FIG. 6 is a diagram illustrating an example of energization statuses of functional devices and a job state of the image processing apparatus.

FIGS. 7A, 7B, and 7C are diagrams illustrating examples of an application attribute.

FIG. 10 is a diagram illustrating an example of an application management table.

FIG. 11 is a flowchart of processing when switching application screens according to the second exemplary embodiment.

DESCRIPTION OF THE EMBODIMENTS

Initially, terms used in the following exemplary embodiments will be described. Hardware devices for providing various functions of an image processing apparatus, such as a scanner device, a printer device, and a FAX device, will be referred to as "functional devices." An application created for past image processing apparatuses not supporting energization control of an exemplary embodiment of the present invention will be referred to as a "legacy application." The legacy application does not support independent energization control for each functional device. The non-legacy application (specific application) supports independent energization control for each functional device.

Figure 1:
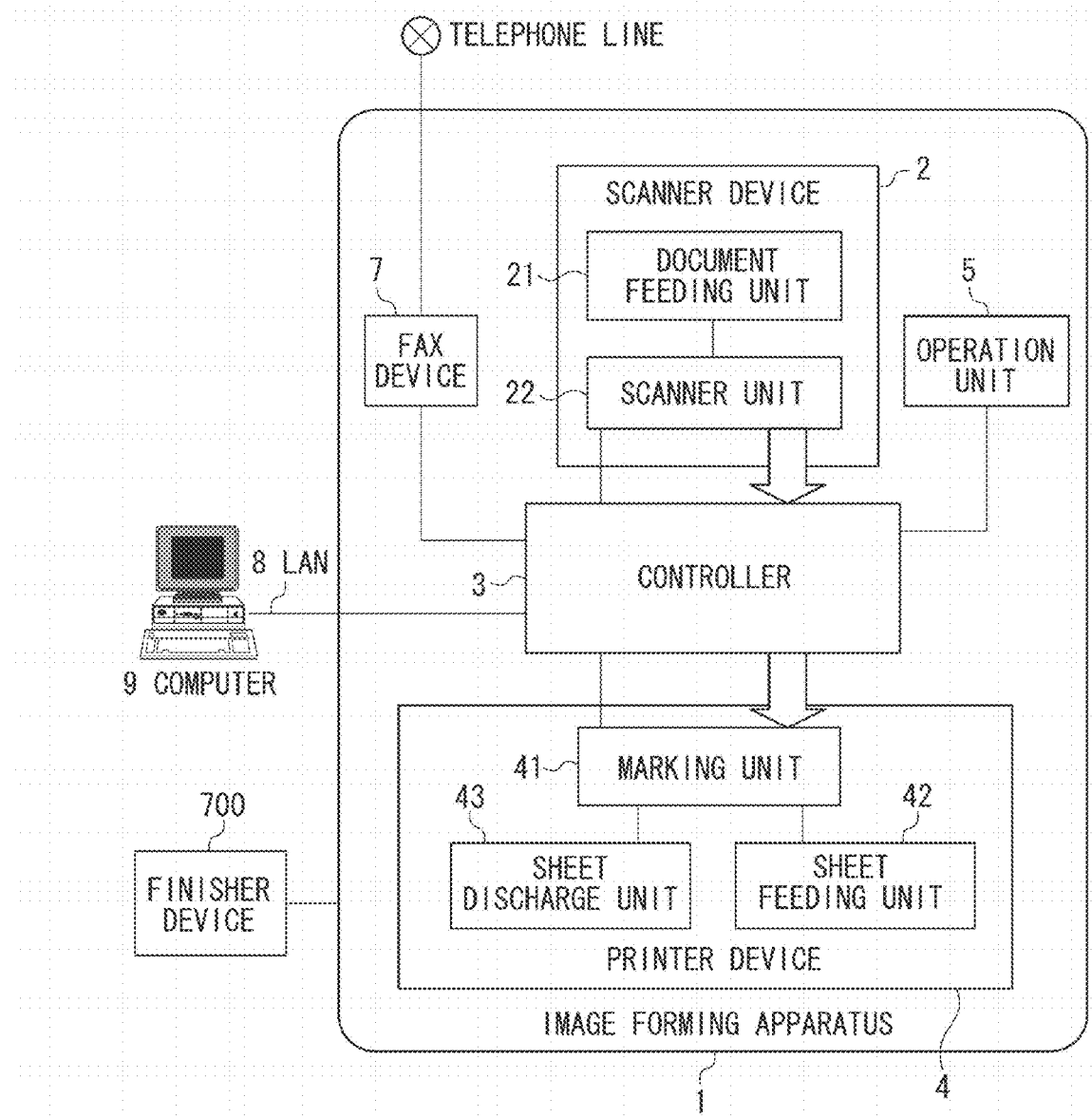
FIG. 1 is a block diagram illustrating an example of a configuration of an image processing apparatus.

FIG. 1 is a block diagram illustrating an example of a configuration of an image processing apparatus, illustrating a first exemplary embodiment of the present invention. In FIG. 1, an image forming apparatus 1 represents the first exemplary embodiment of the image processing apparatus according to the present invention. The image forming apparatus 1 is a multifunction peripheral that can perform a wide variety of jobs such as copy and printing. The image forming apparatus 1 includes a scanner device 2, a printer device 4, a controller 3, an operation unit 5, and a FAX device 7.

The scanner device 2 includes a document feeding unit 21 which can automatically change document stacks in order and a scanner unit 22 which can optically scan and convert a document into a digital image. The scanner device 2 transmits converted image data to the controller 3.

The printer device 4 is a device for printing a digital image. The printer device 4 includes a sheet feeding unit 42 which can successively feed sheets from a sheet stack one by one, a marking unit 41 for printing image data on the fed sheet, and a sheet discharge unit 43 for discharging the printed sheet. A finisher device 700 performs processing such as sheet discharging, sorting, stapling, punching, and cutting on a sheet or sheets output from the sheet discharge unit 43 of the printer device 4 of the image forming apparatus 1.

The operation unit 5 includes a touch panel and a liquid crystal display (LCD). The operation unit 5 is configured to display setting screens of various functions of the image forming apparatus 1 and to make operations such as giving operation instructions. The FAX device 7 transmits and receives a digital image to/from a telephone line.

The controller 3 runs control programs and issues instructions to the connected modules to execute a job on the image forming apparatus 1. A computer 9 can input and output a digital image from/to and issue a job to the image forming apparatus 1 via a local area network (LAN) 8. The controller 3 is configured such that the computer 9 can connect to the image forming apparatus 1 via a web browser and install an application to add a new function. If an application is installed, various files related to the application are stored into a hard disk drive (HDD) 304 (see FIG. 2). The various files related to the applications include an application file that describes attribute information about the applications as illustrated below in FIG. 7.

Figure 2:
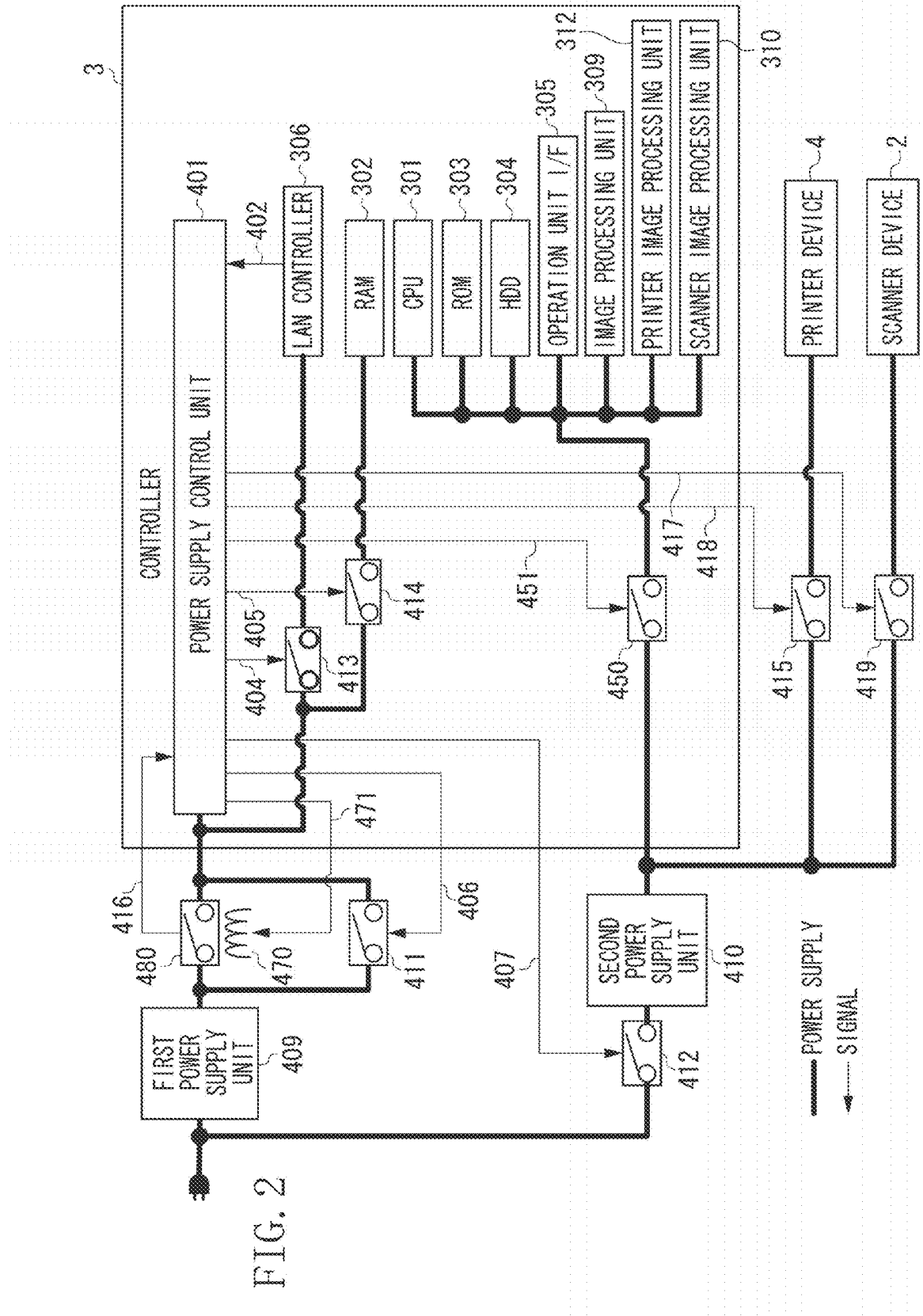
FIG. 2 is a diagram illustrating an example of a hardware configuration related to power supply control of the image processing apparatus.

FIG. 2 is a block diagram illustrating a hardware configuration related to power supply control of the controller 3, the scanner device 2, and the printer device 4.

A power supply control unit 401 performs power supply control at the time of start-up and power-off, and controls a change of a power supply state such as a shift to and return from a power saving state. The power supply control unit 401 is a portion that detects a return factor (such as FAX reception and pressing of a switch of the operation unit 5) when returning from the power saving state to a standby state. According to each return factor, the power supply control unit 401 performs power supply control when entering the standby state. The image forming apparatus 1 can be operated by switching at least between the standby state and the power saving state which has lower power consumption than that of the standby state.

The power supply control unit 401 receives commands from a central processing unit (CPU) 301 and signals for detecting a return from the power saving state. Examples of the signals include a wake signal 402 to be described below. According to the commands, the power supply control unit 401 controls whether to supply power from a first power supply unit 409 and a second power supply unit 410 to various devices. The power supply control unit 401 further performs energization control on a solenoid 470 to turn off a power switch 480 when a shutdown is executed from a remote environment (for example, the computer 9).

When the image forming apparatus 1 is in a sleep state, a LAN controller 306 may receive a packet to the own apparatus via a network 60. The wake signal 402 is a signal output from the LAN controller 306 to notify the power supply control unit 401 of the reception of the packet. If the power supply control unit 401 detects the wake signal 402, the power supply control unit 401 controls control signals 407, 417, 418, and 451 to select power supply to be supplied to the devices.

Control signals 404 to 407, 417, 418, and 451 are signals for controlling whether to supply power to the devices. Switches 411 to 414, 415, 419, and 450 are controlled by the control signals 404 to 407, 417, 418, and 451, respectively. The power supply control unit 401 can control the switches 411 to 414, 415, 419, and 450 by the control signals 404 to 407, 417, 418, and 451, respectively, to change power supply states of the devices. The switches 411 to 414, 415, 419, and 450 can be realized by field effect transistors (FETs) or relay switches.

The control signal 404 and the switch 413 control the power supply to the LAN controller 306. The power supply control unit 401 performs control to supply power to the LAN controller 306 if the image forming apparatus 1 is in the standby state or the sleep state, and stop the power supply to the LAN controller 306 if the image forming apparatus 1 is in an off state.

The control signal 405 and the switch 414 control the power supply from the first power supply unit 409 to a random access memory (RAM) 302. For example, the power supply control unit 401 performs control to supply power from the first power supply unit 409 to the RAM 302 in a self-refresh state if the image forming apparatus 1 is in the sleep state, and stop the power supply from the first power supply unit 409 to the RAM 302 to put the image forming apparatus 1 into the off state.

The control signal 406 and the switch 411 control the power supply from the first power supply unit 409 to the controller 3. If the user turns on the power switch 480 to be described below, the power supply control unit 401 receives a state notification signal 416 of the power switch 480. The power supply control unit 401 then turns the control signal 406 and the switch 411 on. As a result, the controller 3 can be supplied with power even when the user turns the power switch 480 off. At this time, the power supply control unit 401 detects the turning-off of the power switch 480 from the state notification signal 416 of the power supply switch 480, and notifies the CPU 301 of the turning off. Thus, after normal shutdown processing is performed, the power supply to the devices is turned off.

The power switch 480 is a switch for the user to operate to power on/off the image forming apparatus 1. An example of the power switch 480 is a rocker switch. If the user turns the power switch 480 on, power is supplied from the first power supply unit 409 to the controller 3. The power switch 480 includes the solenoid 470 inside. The power switch 480 is configured such that the solenoid 470 can be energized to turn the power switch 480 off. If shutdown processing from a remote environment is accepted, the solenoid 470 can be controlled and energized by a solenoid control signal 471 to turn the power switch 480 off.

The control signal 407 and the switch 412 control the supply of an alternating-current (AC) power source to the second power supply unit 410. The second power supply unit 410 is a power supply that is turned off when in the power saving state, and turned on when in the standby state. For example, if the power supply control unit 401 receives the wake signal 402 in the power saving state, the power supply control unit 401 controls the control signal 407 to turn the switch 412 on. This can turn on the power supply for the devices needed in the standby state.

The first power supply unit 409 converts the AC power source into a direct-current (DC) power supply, and supplies a first power supply to the power supply control unit 401. The first power supplied from the first power supply unit 409 is provided to supply power to the power supply control unit 401 and do on even if the image forming apparatus 1 is in the power saving state. Aside from the power supply control unit 401, the first power supply is supplied to the LAN controller 306. The LAN controller 306 is configured to detect a packet addressed to the own apparatus from the network 60 to return from the power saving state.

The second power supply unit 410 converts the AC power source into a DC power supply, and supplies a second power supply to various devices. The second power supplied from the second power supply unit 410 is stopped if the image forming apparatus 1 is in the power saving state. The second power supply unit 410 is provided to supply power to the devices that do not need to be powered in the power saving state.

Figure 3B:
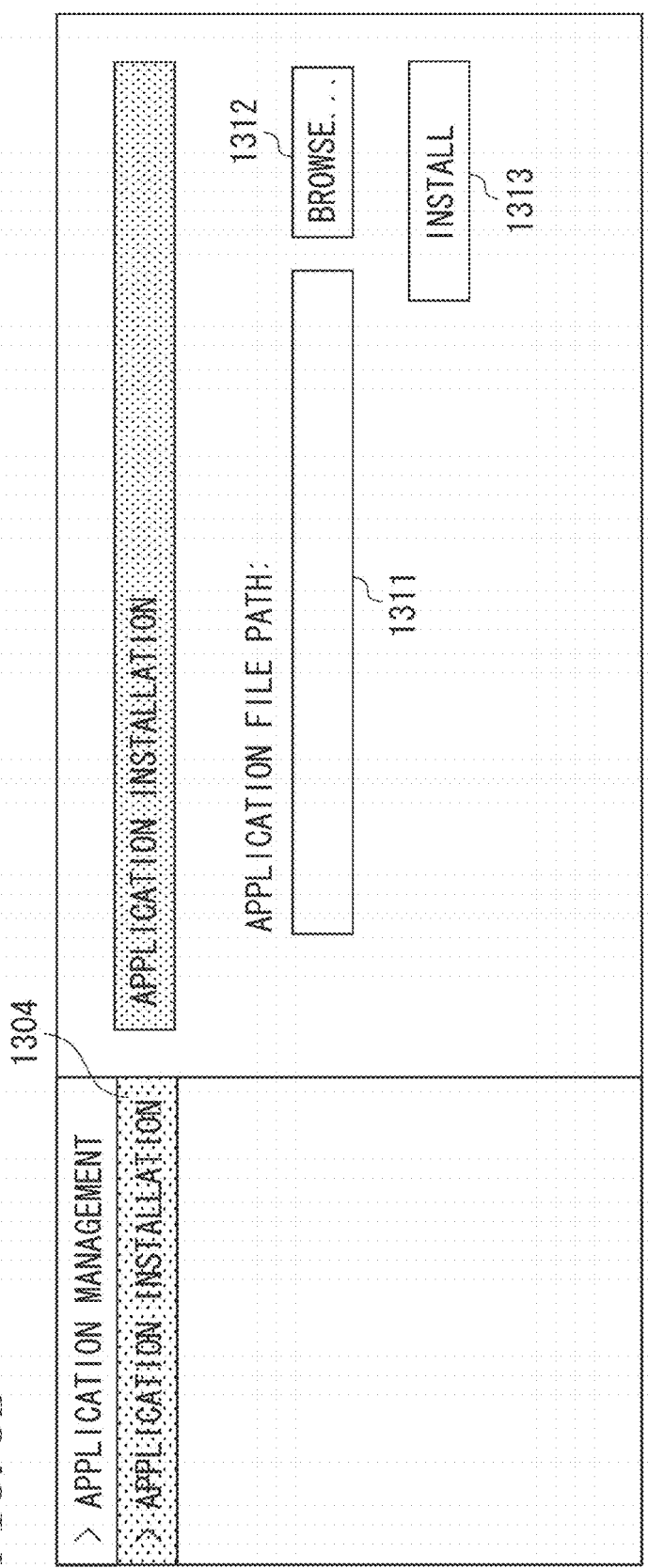

FIGS. 3A and 3B are diagrams illustrating examples of a screen displayed on the web browser on the computer 9 when applications running on the image forming apparatus 1 are to be managed.

FIG. 3A illustrates an example of the first screen to be displayed when an application management page of the image forming apparatus 1 is accessed from the web browser of the computer 9.

A menu area 1301 is an area in which menus for application management are displayed. A control screen area 1302 is an area in which a screen according to a menu selected in the menu area 1301 is displayed.

In the menu area 1301, an application management menu 1303 is a menu for starting, stopping, and uninstalling an application installed on the image forming apparatus 1. An application installation menu 1304 is a menu for installing an application. If the application management page is accessed for the first time, the application management menu 1303 is selected, and a screen for managing applications is displayed in the control screen area 1302. In other words, FIG. 3A corresponds to a case where the application management menu 1303 is selected in the menu area 1301.

In the control screen area 1302, an application list area 1305 is an area in which a list of applications for providing functions of the image forming apparatus 1 installed on the image forming apparatus 1, such as COPY and SEND, is displayed. An authentication application list area 1306 is an area in which a list of special applications for performing authentication is displayed.

An application name field 1307 is an area in which application names and version numbers are displayed. A state field 1308 is intended to display the states of the applications. In the state field 1308, either "started" or "stopped" is displayed.

An application control button field 1309 is an area in which buttons for starting or stopping the applications are displayed. The buttons displayed in the application control button field 1309 vary according to the states of the applications. If an application is in the "started" state, a "stop" button is displayed. If an application is in the "stopped" state, a "start" button is displayed. Authentication applications are configured such that either one is exclusively activated. For the authentication applications, "select" buttons are therefore displayed in the application control button field 1309. If a "select" button is pressed, the authentication application currently in the "started" state is stopped and the selected authentication application is started.

An uninstall button field 1310 is an area in which buttons for uninstalling the applications from the image forming apparatus 1 are displayed. If a button in the uninstall button field 1310 is pressed, the corresponding application is uninstalled.

FIG. 3B illustrates an example of a screen displayed when the application installation menu 1304 is selected in the menu area 1301.

An application file path input field 1311 is a field for specifying the file path of an application the user wants to install on the computer 9. A browse button 1312 is a button for inputting the file path into the application file path input field 1311 by selecting the application file from a file selection dialog.

An installation button 1313 is a button for transmitting the application specified in the application file path input field 1311 to the image forming apparatus 1 and issuing an installation instruction. Applications employed herein are not necessarily dedicated to a specific image forming apparatus and can be implemented as commonly operable in each model. Such applications can be installed and operated on image forming apparatuses to be released in the future.

Figure 4A:
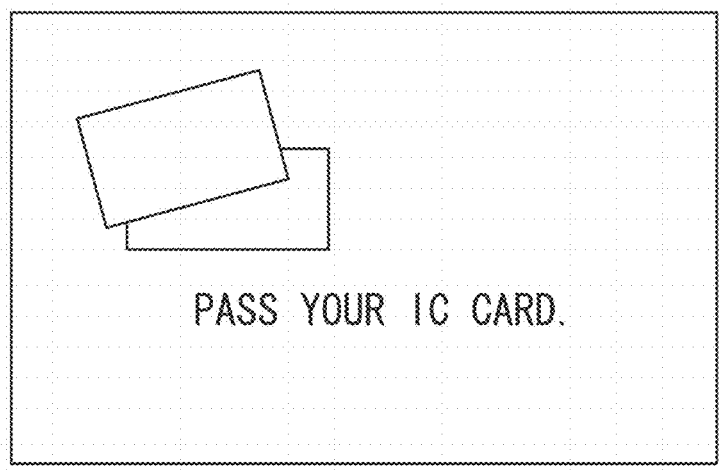
FIGS. 4A and 4B are diagrams illustrating examples of a screen displayed on an operation unit.
Figure 4B:
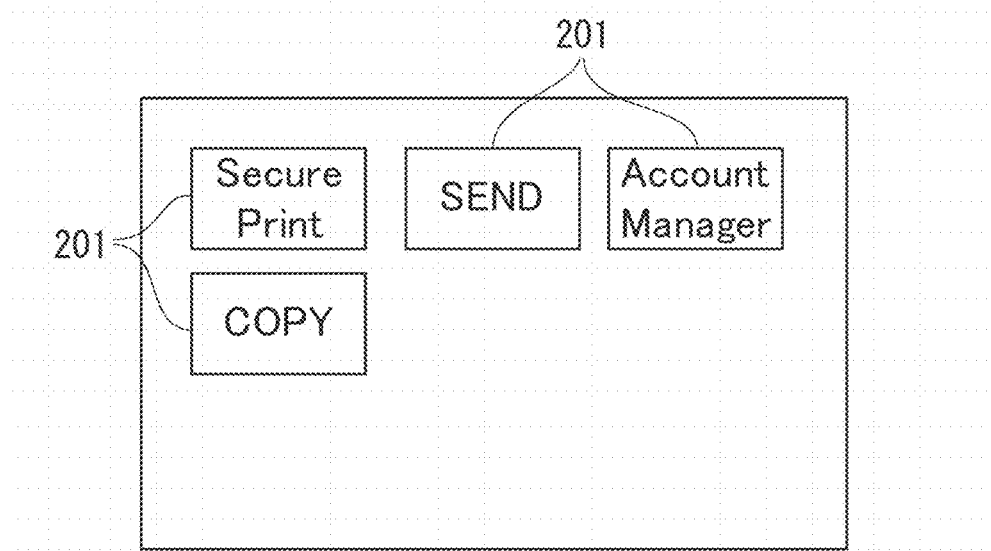

FIGS. 4A and 4B are diagrams illustrating examples of screens displayed on the operation unit 5.

FIG. 4A illustrates an example of an authentication application screen, which is the first screen to be displayed when the image forming apparatus 1 is activated. The example of FIG. 4A illustrates a screen of an authentication application that performs integrated circuit (IC) card authentication. The user passes an IC card over a card reader (not illustrated) connected to the image forming apparatus 1 for authentication. If a valid IC card is passed over the card reader, authentication succeeds. After successful authentication, a selection screen (FIG. 4B) for using the functions of the image forming apparatus 1 is displayed on the operation unit 5.

The screen of FIG. 4B displays buttons 201 corresponding to applications installed on the image forming apparatus 1. If the user touches a button corresponding to the function he/she wants to use, the screen shifts to a setting screen of the function. For example, if the user touches a copy button, the screen is switched to a setting screen for a COPY application.

When the user finishes using the functions of the image forming apparatus 1, the user presses an identification (ID) key (not illustrated) arranged on the operation unit 5 to log out. The display of the operation unit 5 then transitions to the authentication screen of FIG. 4A. If the user has not operated the operation unit 5 for a certain period of time, the image forming apparatus 1 automatically logs out and the display of the operation unit 5 returns to the screen of FIG. 4A.

Figure 5:
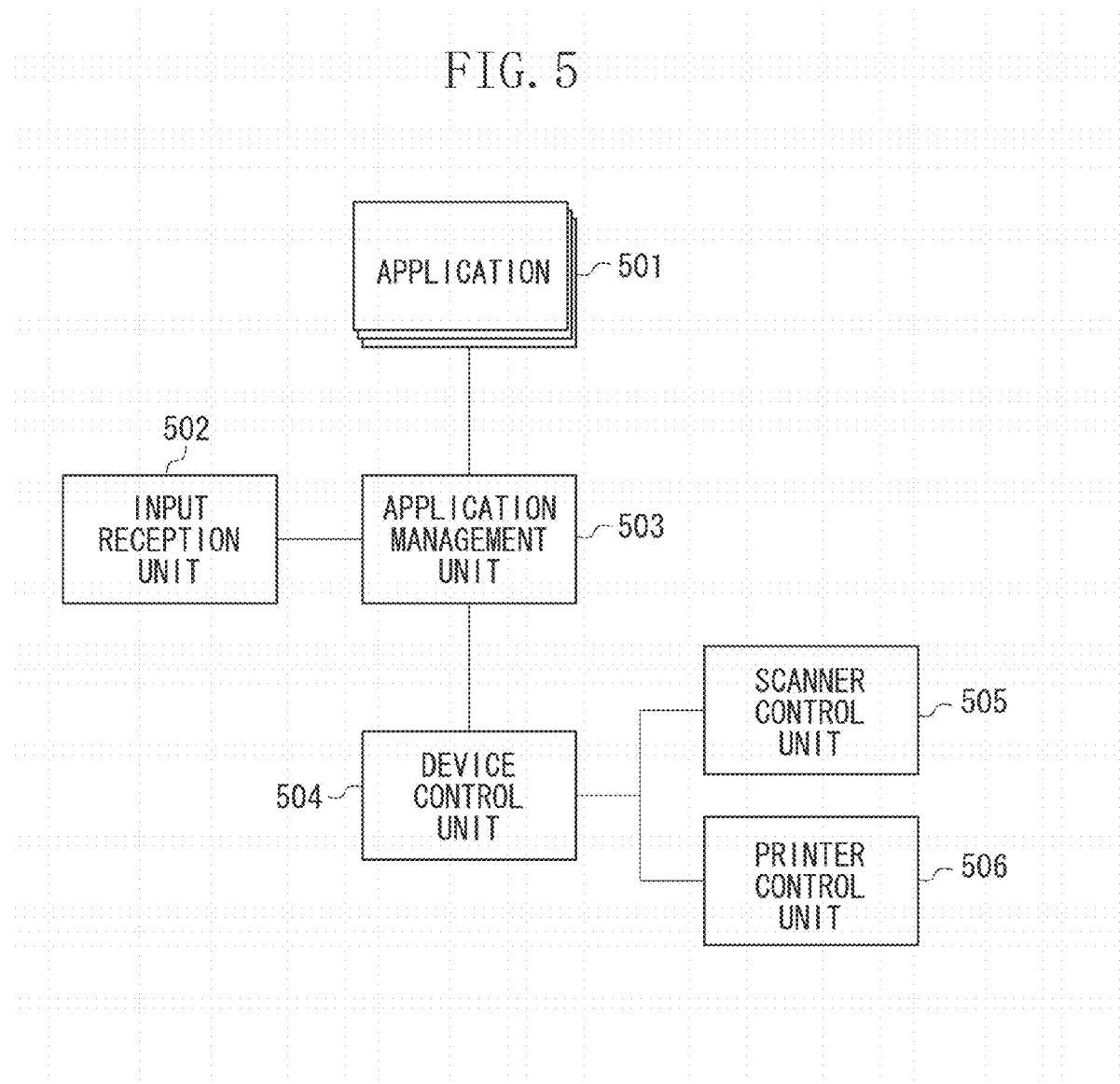
FIG. 5 is a block diagram of software modules related to control of application screens.

FIG. 5 is a block diagram illustrating an example of a configuration of software modules related to the control of application screens displayed on the operation unit 5 according to the present exemplary embodiment. Software modules 501 to 506 illustrated in FIG. 5 correspond to functional units realized by the CPU 301 of the controller 3 which reads and executes programs stored in a read-only memory (ROM) 303 or the HDD 304.

Applications 501 are modules that control the scanner device 2 and/or the printer device 4 to provide the functions of the image forming apparatus 1 to the user. A plurality of applications can exist on the image forming apparatus 1. Applications can be freely added by the method described in FIGS. 3A and 3B. When installing applications 501 or when activating the image forming apparatus 1, application registration processing is performed on an application management unit 503 so that the applications 501 becomes selectable on the screen of FIG. 4B. The application registration processing may be performed by installers of the applications 501. Alternatively, the applications 501 may be started upon completion of the installation, and the started applications 501 may perform the application registration processing by themselves.

An input reception unit 502 is a module for receiving the user's input from the operation unit 5. The input reception unit 502 issues an application screen switchover request to the application management unit 503 and notifies the applications 501 of the input via the application management unit 503.

The application management unit 503 switches screens according to the application screen switchover request from the input reception unit 502. The application management unit 503 also performs energization control on the scanner device 2 and the printer device 4 via a device control unit 504 according to an attribute of the application 501 to be switched.

The device control unit 504 performs the energization control over the devices via a scanner control unit 505 and a printer control unit 506. The scanner control unit 505 is a module that controls the scanner device 2. The printer control unit 506 is a module that performs the energization control over the printer device 4.

FIG. 6 is a diagram illustrating an example of energization states and job states of the controller 3, the scanner device 2, and the printer device 4, in the image forming apparatus 1.

In FIG. 6, the horizontal axis indicates time. Changes of the job state of the image forming apparatus 1 and the energization states of the controller 3, the scanner device 2, and the printer device 4 when events occur are illustrated in full lines.

The controller 3 has three operation states including an ON state, an ON (sleep) state, and an OFF state. The ON state is a state in which all control programs on the controller 3 are operable. The ON (sleep) state is a state in which the control programs are not operating and minimum operations for returning to the ON state can be performed by an interrupt. The OFF state is a state in which the controller 3 is not supplied with power.

The scanner device 2 and the printer device 4 have three operation states including an ON (wait operation cancelled) state, an ON (wait operation) state, and an OFF state. The ON (wait operation cancelled) state is a state in which jobs are ready to be executed. The ON (wait operation) state of the scanner device 2 is a state in which movable portions are not operated. For example, home position detection for a reading operation is not performed. The ON (wait operation) state of the printer device 4 is a state in which movable portions are not operated. For example, motors and polygonal mirrors for printing are not operated, or temperature of a transfer unit for printing is not adjusted. In other words, the ON (wait operation) state is a state having lower power consumption than that of the ON (wait operation cancelled) state. The OFF state is a state in which the scanner device 2 and the printer device 4 are not supplied with power. The image forming apparatus 1 can independently control the power states of one or more functional devices (e.g., scanner device 2, printer device 4) which can be achieved by switching over a plurality of power states as described above.

In step S101, the user turns on the power switch 480 of the image forming apparatus 1 and the image forming apparatus 1 performs start processing to enter a start processing state. When the start processing is completed, the image forming apparatus 1 enters an idle state. After a lapse of a predetermined time, in step S102, the image forming apparatus 1 enters the sleep state.

In step S103, if the user presses a power saving key (not illustrated) of the operation unit 5, the image forming apparatus 1 enters the idle state again. The power saving key is configured to shift the image forming apparatus 1 to the sleep state and back from the sleep state to the idle state.

In step S104, when the display of the operation unit 5 transitions to a SEND application screen after user authentication, the energization state of only the scanner device 2 changes to the ON (wait operation cancelled) state. The SEND application has an application attribute defined to use only the scanner device 2. The application attribute will be described below.

In step S105, if the user makes a transmission setting and then issues an instruction to perform transmission processing, at this point, since the scanner device 2 is in the ON (wait operation cancelled) state, a scan operation is quickly performed without subjecting the user to stress. At this time, the printer device 4 is in the ON (wait operation) state, so that the power consumption of the printer device 4 is suppressed low. When the transmission processing is completed, the image forming apparatus 1 shifts to the idle state. If a predetermined time has elapsed without operating the image forming apparatus 1, then in step S106, the image forming apparatus 1 shifts to the sleep state again.

In step S107, if the user presses the power saving key, the image forming apparatus 1 enters the idle state again. Next, in step S108, if the display of the operation unit 5 transitions to a COPY application screen after user authentication, the energization states of both the scanner device 2 and the printer device 4 change to the ON (wait operation cancelled) state. In this case, it is assumed that the COPY application is a legacy application that does not support independent energization control for each functional device.

In step S109, the user makes a copy execution operation. Since the scanner device 2 and the printer device 4 have already been in the ON (wait operation cancelled) state, a copy operation is quickly performed without subjecting the user to stress. When the copy operation is completed, the image forming apparatus 1 enters the idle state. If a predetermined time has elapsed without operating the image forming apparatus 1, in step S110, the image forming apparatus 1 shifts to the sleep state again.

FIGS. 7A to 7C are diagrams illustrating examples of an application attribute. An application attribute is a text file describing characteristics of an application. The application attribute is included in the application file.

FIG. 7A illustrates an example of attribute information about the SEND application that supports the independent energization control for each functional device.

ApplicationName 701 is an attribute indicating an application name. ApplicationVersion 702 is an attribute indicating the version of the application. SmartPowerSaver 703 is an attribute indicating that the application is configured to support the independent energization control for each functional device. InitRequiredDevice 704 is an attribute indicating a functional device that needs to be energized. In this example, the InitRequiredDevice 704 attribute indicates "Scanner." Therefore, if the screen is switched to this application, only the scanner device 2 is controlled to enter the ON (wait operation cancelled) state.

FIG. 7B illustrates an example of attribute information about a legacy application (application created for past image forming apparatuses not supporting the energization control according to the present exemplary embodiment).

For past image forming apparatuses, the SmartPowerSaver 703 attribute is not defined. In the application, the SmartPowerSaver 703 attribute is therefore not described. The presence or absence of the SmartPowerSaver 703 attribute can thus be determined by determining whether the application is a legacy application.

FIG. 7C illustrates an example of attribute information about an authentication application.

ApplicationType 705 is an attribute indicating the type of the application. For an authentication application, the ApplicationType 705 attribute is defined as "Authentication." For a general application, the ApplicationType 705 attribute does not need to be described. An application for which the ApplicationType 705 attribute is not defined can be determined to be a general application. In the present exemplary embodiment, authentication applications do not execute a job. The energization control is thus applied only to general applications (i.e., predetermined applications for which the ApplicationType 705 attribute are not defined).

A flow of processing performed by the application management unit 503 when switching over applications for which an operation screen is displayed on the operation unit 5 according to the first exemplary embodiment, will be described below with reference to FIG. 8.

Figure 8:
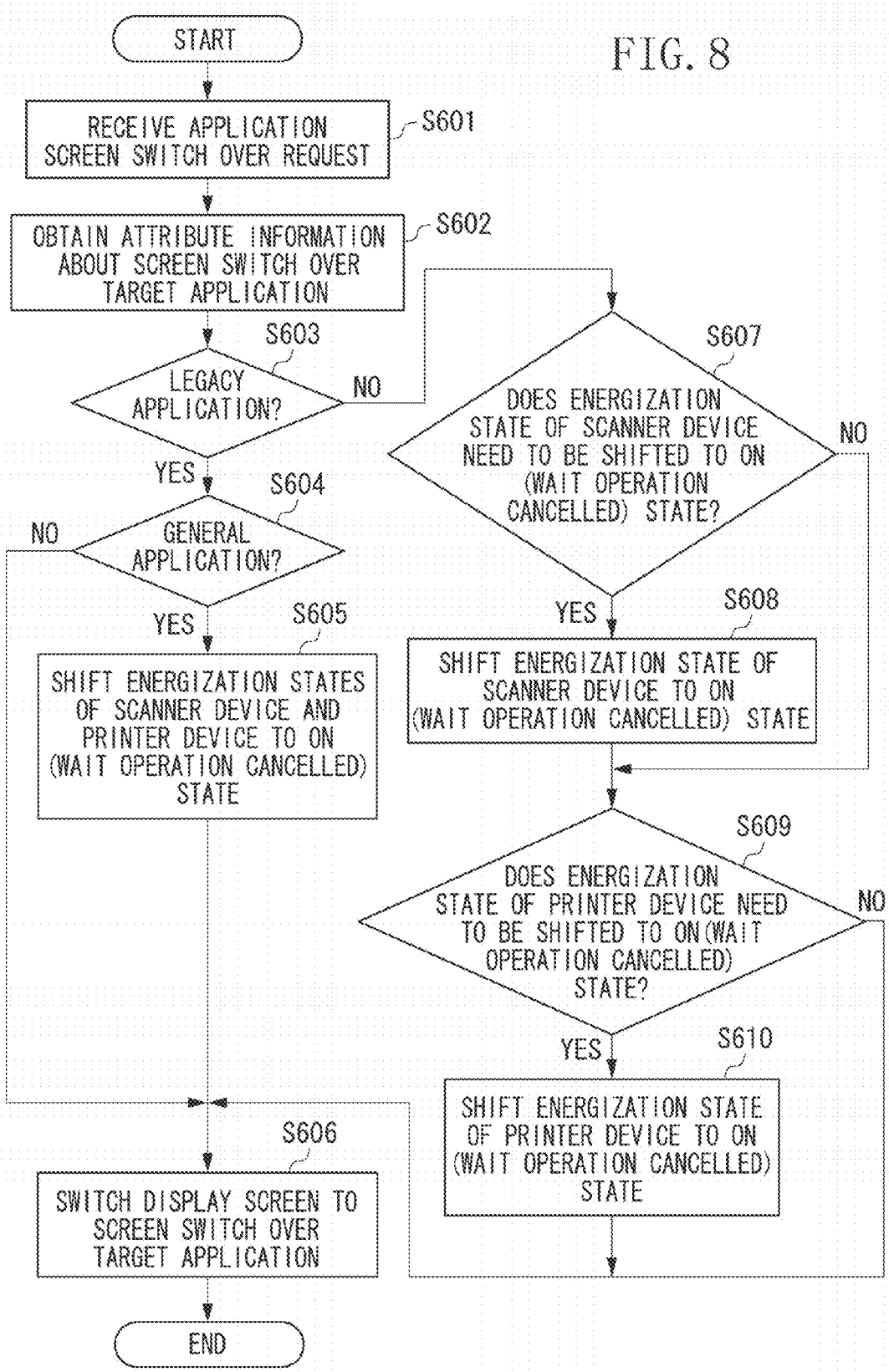
FIG. 8 is a flowchart of processing when switching application screens according to a first exemplary embodiment.

FIG. 8 is a flowchart illustrating an example of the processing performed by the application management unit 503 when switching over the application screens (the operation screens of applications) according to the first exemplary embodiment. The processing illustrated in the flowchart of FIG. 8 is performed by the CPU 301 of the controller 3 reading and executing a program stored in the ROM 303 or the HDD 304.

In step S601, if the application management unit 503 receives an application screen switchover request from the input reception unit 502, the application management unit 503 advances the processing to step S602. In step S602, the application management unit 503 obtains the attribute information about the application screen which is to be switched according to the request in the foregoing step S601 (hereafter, referred to as screen-switchover target application).

In step S603, the application management unit 503 determines whether the screen-switchover target application is a legacy application based on the attribute information obtained in the foregoing step S602. Specifically, if the attribute information obtained in the foregoing step S602 does not include the SmartPowerSaver 703 attribute, the application management 503 determines the screen switch-over target application to be a legacy application.

In step S603, if the screen switch-over target application is determined to be a legacy application (YES in step S603), the application management unit 503 advances the processing to step S604.

In step S604, the application management unit 503 determines whether the type of the screen switch-over target application is a general application based on the attribute information obtained in the foregoing step S602. In the present exemplary embodiment, if the attribute information obtained in the foregoing step S602 does not include the ApplicationType 705 attribute, the application management unit 503 determines the screen switch-over target application to be a general application.

In the foregoing step S604, if the type of the screen switch-over target application is determined to be a general application (YES in step S604), the application management unit 503 advances the processing to step S605.

In step S605, if the application management unit 503 shifts the energization states of the scanner device 2 and the printer device 4 to the ON (wait operation cancelled) state, the application management unit 503 advances the processing to step S606. In step S606, the application management unit 503 switches over the display screen to the application screen which is to be switched according to the request in the foregoing step S601 (i.e., the screen switch-over target application), and ends the processing of the present flowchart.

In the foregoing step S604, if the type of the screen switch-over target application is determined to not be a general application (NO in step S604), the application management unit 503 advances the processing to step S606.

In the foregoing step S603, if the screen switch-over target application is determined to not be a legacy application (NO in step S603), the application management unit 503 advances the processing to step S607.

In step S607, the application management unit 503 determines whether the energization state of the scanner device 2 needs to be shifted to the ON (wait operation cancelled) state based on the attribute information obtained in the foregoing step S602. In the present exemplary embodiment, if the InitRequiredDevice 704 attribute of the attribute information obtained in the foregoing step S602 includes "Scanner," the application management unit 503 determines that the energization state of the scanner device 2 needs to be shifted to the ON (wait operation cancelled) state.

If it is determined that the energization state of the scanner device 2 needs to be shifted to the ON (wait operation cancelled) state (YES in step S607), the application management unit 503 advances the processing to step S608. In step S608, the application management unit 503 shifts the energization state of the scanner device 2 to the ON (wait operation cancelled) state, and advances the step S609.

On the other hand, if is determined that the energization state of the scanner device 2 does not need to be shifted to the ON (wait operation cancelled) state (NO in step S607), the application management unit 503 advances the processing simply to step S609.

In step S609, the application management unit 503 determines whether the energization state of the printer device 4 needs to be shifted to the ON (wait operation cancelled) state based on the attribute information obtained in the foregoing step S602. In the present exemplary embodiment, if the InitRequiredDevice 704 attribute of the attribute information obtained in the foregoing step S602 includes "Printer," the application management unit 503 determines that the energization state of the printer device 4 needs to be shifted to the ON (wait operation cancelled) state.

If it is determined that the energization state of the printer device 4 needs to be shifted to the ON (wait operation cancelled) state (YES in step S609), the application management unit 503 advances the processing to step S610. In step S610, the application management unit 503 shifts the energization state of the printer device 4 to the ON (wait operation cancelled) state, and the application management unit 503 advances the step S606.

On the other hand, if it is determined that the energization state of the printer device 4 does not need to be shifted to the ON (wait operation cancelled) state, the processing simply proceeds to step S606.

As has been described above, the attribute information about an application is configured to define an application attribute that indicates whether the application supports the independent energization control. If the application attribute is not defined, the application is determined to be a legacy application. When application screens are switched over, if the screen-shift target application is a legacy application, the energization states of both the scanner device 2 and the printer device 4 are shifted to the ON (wait operation cancelled) state.

After shifting to the ON state, the screen is switched over. This can prevent degradation in performance at the time of job execution even when running a legacy application which does not support the independent power control for each functional device.

Further, the attribute information about an application defines an attribute indicating a functional device which needs energization control at the time of screen shift. Thus, an application which may perform energization control only at the timing of screen shift can realize the independent energization control without a special installment process. As a result, the convenience to application developers is improved which facilitates the creation of applications supporting the independent power control for each functional device control.

According to the present exemplary embodiment, degradation in performance at the time of job execution can be prevented even if the image processing apparatus 1 that can run applications supporting the independent power control for each functional device runs a legacy application which does not support the independent power control for each functional device.

The foregoing first exemplary embodiment has dealt with the case where the energization control is performed based on attribute information described in an application attribute file. A second exemplary embodiment deals with a case where energization control is performed by using an application management table. A system configuration, a hardware configuration related to power supply control, a user interface (UI), and energization states are similar to those of the first exemplary embodiment. A description thereof will thus be omitted. A software block diagram is also similar to that of FIG. 5. However, there are differences in details of control of the application management unit 503, which are described below.

In the second exemplary embodiment, the application management unit 503 can receive energization control information (for example, the value of the InitRequiredDevice 704 attribute) about the devices when accepting application registration from the applications 501. An application 501 supporting the independent power control for each functional device issues an application registration request including the energization control information about the devices to the application management unit 503 when requesting application registration. If the application management unit 503 receives the application registration request from the application 501, the application management unit 503 generates an application management table (FIG. 10) including the energization control information about the devices, for example, in the HDD 304. When an application screen switch-over request is received, the application management unit 503 performs energization control on the scanner device 2 and the printer device 4, if needed, based on the information about the application management table. The other components of FIG. 5 are similar to those of the first exemplary embodiment. A description thereof will be omitted.

In the first exemplary embodiment, as illustrated in FIG. 7A, the application attribute defines the attribute for controlling the energization states of the scanner device 2 and the printer device 4 (SmartPowerSaver 703). In the second exemplary embodiment, this attribute is not defined. However, similar attributes to those of FIGS. 7B and 7C are defined also in the second exemplary embodiment.

Figure 9:
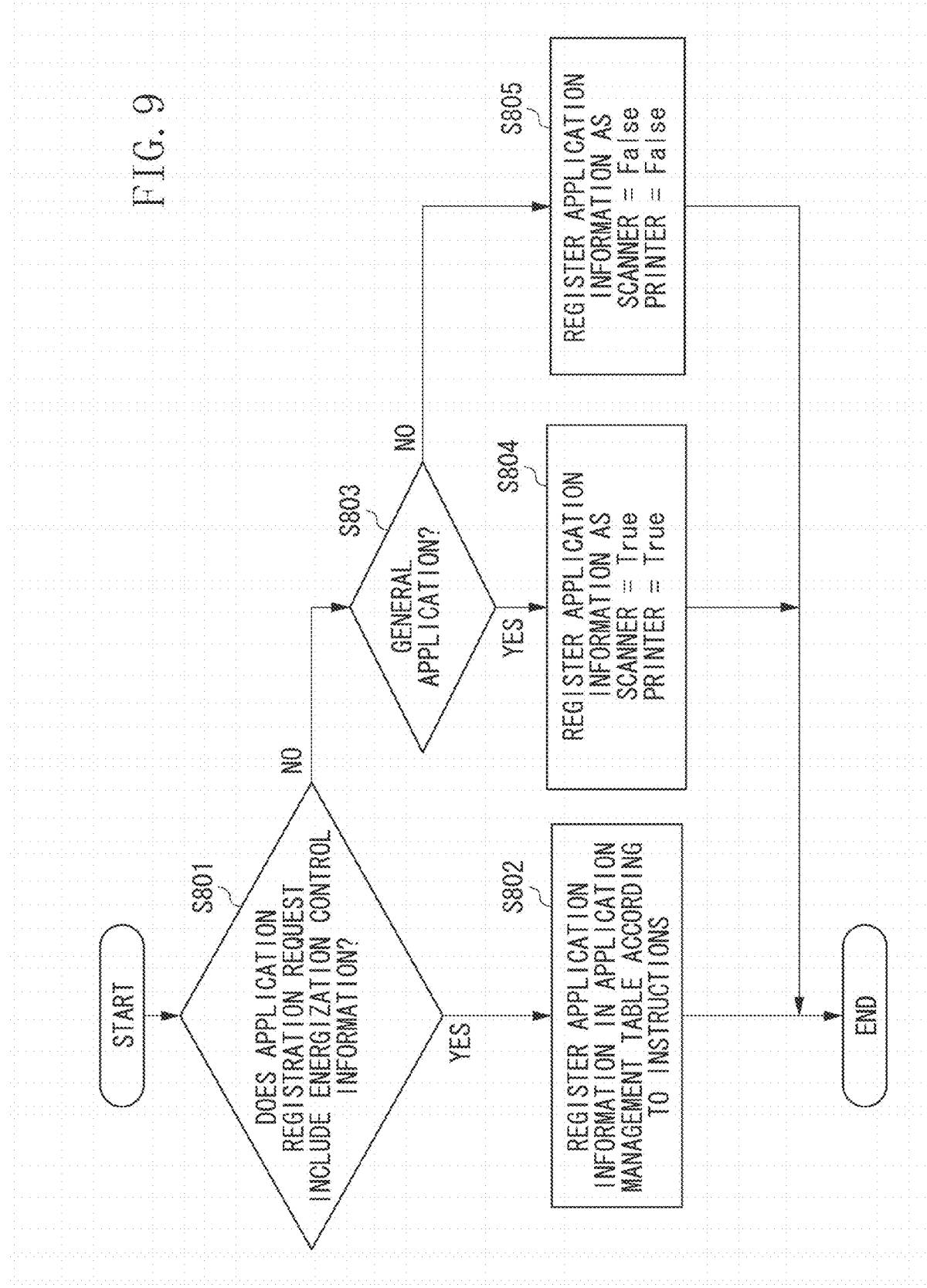
FIG. 9 is a flowchart of processing when an application registration is requested according to a second exemplary embodiment.

FIG. 9 is a flowchart illustrating an example of processing of the application management unit 503 when the application management unit 503 receives an application registration request from an application 501. The processing illustrated in the flowchart of FIG. 9 is realized by the CPU 301 of the controller 3 reading and executing a program stored in the ROM 303 or the HDD 304.

When the application management unit 503 receives an application registration request from the application 501, then in step S801, the application management unit 503 determines whether the application registration request includes energization control information about the devices.

If it is determined that the application registration request includes energization control information about the devices (YES in step S801), the application management unit 503 advances the processing to step S802. In step S802, the application management unit 503 registers, for example, application information in the application management table as illustrated in FIG. 10 according to instructions of the energization control information about the devices included in the application registration request, and the application management unit 503 ends the present flowchart.

In the foregoing step S801, if it is determined that the application registration request does not include energization control information about the devices (NO in step S801), the application management unit 503 advances the processing to step S803. In step S803, the application management unit 503 obtains the attribute information about the application 501 and determines whether the application 501 is a general application. In the present exemplary embodiment, if the attribute information obtained in the foregoing step S602 does not include the ApplicationType 705 attribute, the application 501 is determined to be a general application.

If the application 501 is determined to be a general application (YES in step S803), the application management unit 503 advances the processing to step S804. In step S804, the application management unit 503 registers application information in the application management table so that both the scanner device 2 and the printer device 4 are subjected to energization control, and the application management unit 503 ends the processing of the present flowchart.

On the other hand, if it is determined that the application 501 is not a general application (NO in step S803), the application management unit 503 advances the processing to step S805. In step S805, the application management unit 503 registers application information in the application management table indicating that neither of the scanner device 2 and the printer device 4 is subjected to energization control, and the application management unit 503 ends the present flowchart.

FIG. 10 is a diagram illustrating an example of the application management table generated when registering an application 501. The application management table is stored in the HDD 304.

The application management table is a table for holding information such as an application ID 901, an application name 902, an application type 903, scanner control 904, and printer control 905 illustrated in FIG. 10. The application ID 901 is an ID for identifying an application 501 on a program. The application ID 901 is uniquely determined when registering the application 501. The application name 902 indicates the name of the application 501. The application type 903 indicates the type of the application 501. Although not illustrated in FIG. 9, the application management unit 503 obtains information about the application name 902 and the application type 903 from the attribute information about the application 501 (FIG. 7), and records the information into the application management table.

The scanner control 904 indicates whether the energization control of the scanner device 2 is needed when switching to the application screen. If the scanner control 904 is "true," it means that the energization state of the scanner device 2 needs to be shifted to the ON (wait operation cancelled) state when the screen is switched to the application 501.

The printer control 905 indicates whether the energization control of the printer device 4 is needed when switching to the application screen. If the printer control 905 is "true," it means that the energization state of the printer device 4 needs to be shifted to the ON (wait operation cancelled) state when the screen is switched to the application 501.

A flow of processing performed by the application management unit 503 when switching application screens according to the second exemplary embodiment will be described below with reference to FIG. 11.

FIG. 11 is a flowchart illustrating an example of the processing performed by the application management unit 503 when switching over the application screens according to the second exemplary embodiment. The processing illustrated in the flowchart of FIG. 11 is realized by the CPU 301 of the controller 3 reading and executing a program stored in the ROM 303 or the HDD 304.

In step S1001, if the application management unit 503 receives an application screen switch-over request from the input reception unit 502, the application management unit 503 advances the processing to the step S1002. In step S1002, the application management unit 503 obtains information about the application screen which is to be switched according to the request in the foregoing step S1001 (hereinafter, screen switch-over target application), from an application management table such as illustrated in FIG. 10.

In step S1003, the application management unit 503 determines whether the application type of the screen switch-over target application is a general application based on the information about the screen switch-over target application obtained in the foregoing step S1002.

If the application type of the screen switch-over target application is determined to be a general application (YES in step S1003), the application management unit 503 advances the processing to step S1004.

In step 1004, the application management unit 503 determines from the information obtained in the foregoing step S1002 whether the screen switch-over target application needs to shift the energization state of the scanner device 2 to the ON (wait operation cancelled) state. If it is determined that the energization state of the scanner device 2 needs to be shifted to the ON (wait operation cancelled) state (YES in step S1004), the application management unit 503 advances the processing to step S1005. In step S1005, the application management unit 503 shifts the energization state of the scanner device 2 to the ON (wait operation cancelled) state, and the application management unit 503 advances the step S1006. On the other hand, if it is determined that the energization state of the scanner device 2 does not need to be shifted to the ON (wait operation cancelled) state (NO in step S1004), the processing simply proceeds to step S1006.

In step S1006, the application management unit 503 determines from the information obtained in the foregoing step S1002 whether the screen-shift target application needs to shift the energization state of the printer device 4 to the ON (wait operation cancelled) state. If it is determined that the energization state of the printer device 4 needs to be shifted to the ON (wait operation cancelled) state (YES in step S1006), the application management unit 503 advances the processing to step S1007. In step S1007, the application management unit 503 shifts the energization state of the printer device 4 to the ON (wait operation cancelled) state, and the application management unit 503 advances the step S1008. On the other hand, if it is determined that the energization state of the printer device 4 does not need to be shifted to the ON (wait operation cancelled) state (NO in step S1006), the processing simply proceeds to step S1008.

In the foregoing step S1003, if the application type of the screen switch-over target application is determined to not be a general application (NO in step S1003), the application management unit 503 similarly advances the processing to step S1008. In step S1008, the application management unit 503 switches the display screen to the application according to the screen switchover request in the foregoing step S1001 (i.e., the screen switch-over target application). Then, the processing of the present flowchart ends.

As has been described above, energization control information about each functional device can be specified at the time of application registration. If energization control information is not specified, the energization states of both the scanner device 2 and the printer device 4 are shifted to the ON (wait operation cancelled) state when the screen shifts to that application. Such a configuration can prevent degradation in performance at the time of job execution even when running a legacy application which does not support independent power control for each functional device.

According to the present exemplary embodiment, when the image processing apparatus capable of running an application that supports the independent power control for each functional device switches over applications to display, the image processing apparatus determines a screen switch-over target application. If the screen switch-over target application is an application which does not support a smart power saving function, the image processing apparatus performs energization and initialization processing of the functional devices such as the scanner device 2 and the printer device 4 in advance before the screen is switched over. With such a configuration, the image processing apparatus can quickly start the processing preventing a decrease in the user's convenience and can prevent a drop in performance at the time of job execution even when running a legacy application which does not support the independent power control for each functional device.

In the foregoing exemplary embodiments, for the sake of simplicity, only the scanner device 2 and the printer device 4 are configured to be independently controllable. However, functional devices needed for the use of functions such as a FAX communication control unit and the HDD 304, may be subdivided and subjected to energization control. Thus, more scrupulous power saving functions can be provided.

In the foregoing exemplary embodiments, the ON (wait operation) state in which movable portions are not operated is defined as the power saving state. However, the present invention is not limited thereto. A state consuming even lower power may be set. Further, the power states may include only two levels, that is, ON and OFF.

In the foregoing exemplary embodiments, the energization control of the application supporting the independent energization control is performed by the application management unit 503. However, the application itself may perform the energization control of an appropriate device at appropriate timing different from screen shift timing. For example, if the application management unit 503 determines that the screen switchover target application is not a legacy application (NO in step S603 of FIG. 8), the processing may simply proceed to step S606 to switch the display screen to the screen switchover target application. A determination step may be provided in which, if YES in step S1003 of FIG. 11, the application management unit 503 determines whether the screen switchover target application is a legacy application. If, in the determination step, the screen switchover target application is determined to not be a legacy application, the application management unit 503 may advance the processing to step S1008 as it is to switch the display screen to the screen switchover target application. With such configurations, the application itself can perform the energization control of an appropriate device at appropriate timing to improve power saving performance.

In the first exemplary embodiment, if, in step S602 of FIG. 8, the application management unit 503 fails to obtain the attribute information about the application, the processing may simply proceed to step S606 without power supply control to switch the display screen to the screen switchover target application. Alternatively, if, in step S602 of FIG. 8, the application management unit 503 fails to obtain the attribute information about the application, the processing may proceed to step S605 to shift the energization states of the scanner device 2 and the printer device 4 to the ON (wait operation cancelled) state.

In the second exemplary embodiment, if, in step S1002 of FIG. 11, the application management unit 503 fails to obtain the information from the application management table, the processing may simply proceed to step S1008 without power supply control to switch the display screen to the screen switchover target application. Alternatively, if, in step S1002 of FIG. 11, the application management unit 503 fails to obtain the information from the application management table, the application management unit 503 may perform steps S1005 and S1007 to shift the energization states of the scanner device 2 and the printer device 4 to the ON (wait operation cancelled) state.

Further, the power supply control of the functional devices may be limited according to the authority of the login user. For example, in steps S605 and S608 of FIG. 8, if the login user does not have SEND, scan, or copy authority, the application management unit 503 does not shift the energization state of the scanner device 2 to the ON (wait operation cancelled) state. In steps S605 and S610 of FIG. 8, if the login user does not have print or copy authority, the application management unit 503 does not shift the energization state of the printer device 4 to the ON (wait operation cancelled) state. This can suppress useless power consumption caused by shifting a functional device about which the login user does not have use authority, to an energized state without permission.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-044014 filed Mar. 6, 2014, which is hereby incorporated by reference herein in its entirety.

What is claimed is:

1. An information processing apparatus on which a plurality of applications are installed and which includes a device, the information processing apparatus comprising:
    a display unit configured to display a screen for selecting an application to execute from among the plurality of applications;
    an acquisition unit configured to obtain attribute information about the application selected on the screen displayed on the display unit, wherein the attribute information includes application information indicating whether the selected application is a specific application, and device information indicating whether to supply power to the device when executing the selected application;
    a determination unit configured to determine whether the selected application is the specific application based on the application information obtained by the acquisition unit; and
    a control unit configured to, if the determination unit determines that the selected application is the specific application, control power supply to the device based on the device information obtained by the acquisition unit, and if the determination unit determines that the selected application is not the specific application and that the selected application is not an authentication application configured to perform authentication of a user, perform control so that power is supplied to the device.

2. The information processing apparatus according to claim 1, wherein the device is a scanner device.

3. The information processing apparatus according to claim 1, wherein the device is a printer device.

4. The information processing apparatus according to claim 1, wherein if the determination unit determines that the selected application is not the specific application and that the selected application is an authentication application configured to perform authentication of a user, power is not supplied to the device.

5. The information processing apparatus according to claim 1, further comprising a storage unit configured to store the application information indicating whether the selected application is the specific application and the device information indicating whether to supply power to the device when executing the selected application.

6. The information processing apparatus according to claim 5, further comprising a registration unit configured to, if the determination unit determines that the selected application is not the specific application, register the device information into the storage unit, the device information indicating that power is supplied to the device when executing the selected application.

7. A method for controlling an information processing apparatus on which a plurality of applications are installed and which includes a device, the method comprising:
    displaying on a display unit a screen for selecting an application to execute from among the plurality of applications;

obtaining attribute information about the application selected on the screen displayed on the display unit, wherein the attribute information includes application information indicating whether the selected application is a specific application, and device information indicating whether to supply power to the device when executing the selected application;

determining whether the selected application is the specific application based on the obtained application information;

if the selected application is determined to be the specific application, controlling power supply to the device based on the obtained device information, and if the selected application is determined to not be the specific application, determining whether the selected application is an authentication application configured to perform authentication of a user; and if the selected application is determined to not be the specific application and the selected application is determined to not be the authentication application configured to perform authentication of a user, performing control so that power is supplied to the device.

8. The method for controlling an information processing apparatus according to claim 7, wherein the device is a scanner device.

9. The method for controlling an information processing apparatus according to claim 7, wherein the device is a printer device.

10. The method for controlling an information processing apparatus according to claim 7, further comprising, if the selected application is determined to not be the specific application and the selected application is determined to be the authentication application configured to perform authentication of a user, not supplying power to the device.

11. The method for controlling an information processing apparatus according to claim 7, further comprising storing in a storage unit the application information indicating whether the selected application is the specific application, and the device information indicating whether to supply power to the device when executing the selected application.

12. The method for controlling an information processing apparatus according to claim 11, further comprising, if the selected application is determined to not be the specific application, registering in the storage unit the device information indicating that power is supplied to the device when executing the selected application.

13. A non-transitory computer-readable storage medium storing instructions that, when executed by a computer of an information processing apparatus on which a plurality of applications are installed and which includes a device, cause the computer to perform operations comprising:

displaying on a display unit a screen for selecting an application to execute from among the plurality of applications;

obtaining attribute information about the application selected on the screen displayed on the display unit, wherein the attribute information includes application information indicating whether the selected application is a specific application, and device information indicating whether to supply power to the device when executing the selected application;

determining whether the selected application is the specific application based on the obtained application information;

if the selected application is determined to be the specific application, controlling power supply to the device based on the obtained device information, and if the selected application is determined to not be the specific application, determining whether the selected application is an authentication application configured to perform authentication of a user; and if the selected application is determined to not be the specific application and the selected application is determined to not be the authentication application configured to perform authentication of a user, performing control so that power is supplied to the device.

* * * * *